United States Patent [19]

Parker et al.

[11] Patent Number: 4,618,652
[45] Date of Patent: Oct. 21, 1986

[54] PROCESS FOR CURING BISMALEIMIDE RESINS

[75] Inventors: John A. Parker, Los Altos; Alvin H. Heimbuch, El Cerrito; Ming-ta S. Hsu; Timothy S. Chen, both of San Jose, all of Calif.

[73] Assignee: The United States of America as represented by the Administrator of the National Aeronautics and Space Administration, Washington, D.C.

[21] Appl. No.: 725,686

[22] Filed: Apr. 22, 1985

Related U.S. Application Data

[62] Division of Ser. No. 553,339, Nov. 18, 1983, Pat. No. 4,526,925.

[51] Int. Cl.$^4$ ............................................. C08F 271/02
[52] U.S. Cl. ..................................................... 525/282
[58] Field of Search ......................................... 525/282

[56] References Cited

U.S. PATENT DOCUMENTS

| 2,958,672 | 11/1960 | Goldberg | 525/282 |
| 3,137,682 | 6/1964 | Corson et al. | 526/265 |
| 3,297,790 | 1/1967 | Acker | 525/282 |
| 3,553,180 | 1/1971 | Cleary | 526/265 |
| 3,752,794 | 8/1973 | Bacskai | 526/265 |
| 3,810,848 | 5/1974 | Chapurlat et al. | 526/265 |
| 3,810,872 | 5/1974 | Chapurlat et al. | 526/265 |
| 3,994,862 | 11/1976 | Ropars et al. | 428/902 |
| 4,229,515 | 10/1980 | Petrak | 526/265 |

OTHER PUBLICATIONS

Report for Period 8-18-80 through 11-30-81, (Dec. 1981), pp. I-V; 1-36; Rockwell International Science Center.

*Primary Examiner*—Harry Wong, Jr.
*Attorney, Agent, or Firm*—Darrell G. Brekke; John R. Manning; Robert D. Marchant

[57] ABSTRACT

When vinyl pyridines including vinyl stilbazole materials and vinyl styrylpyridine oligomer materials are admixed with bismaleimides and cured to form copolymers the cure temperatures of the copolymers are substantially below the cure temperatures of the bismaleimides alone.

20 Claims, 1 Drawing Figure

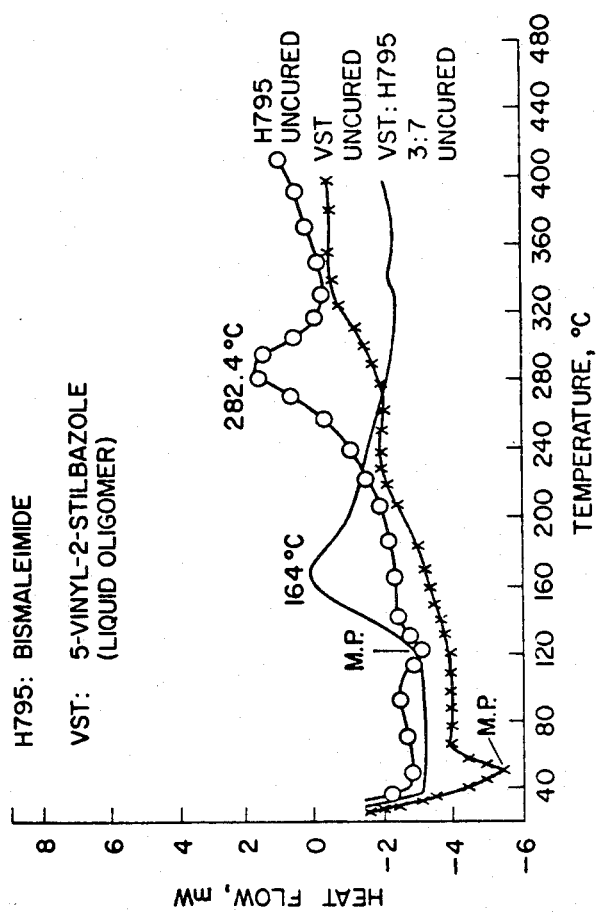

PROCESS FOR CURING BISMALEIMIDE RESINS

ORIGIN OF THE INVENTION

The invention described herein was made in the performance of work under a NASA contract and is subject to Public Law 96-517 (35 U.S.C. §200 et seq.). The contractor has not elected to retain title to the invention.

This is a continuation of application Ser. No. 553,339, filed 11/18/83, now U.S. Pat. No. 4,526,925.

TECHNICAL FIELD

This invention relates to vinyl pyridine group-containing compounds and oligomers, their advantageous copolymerization with bismaleimide resins, and the formation of reinforced composites based on these copolymers.

BACKGROUND

Bismaleimides are being increasingly used as matrix resins for fiber-reinforced composites, especially high-performance graphite fiber-reinforced composites. The monomers are cured by a thermally induced addition reaction to give highly crosslinked, void-free network polymers having good physical properties with higher thermal stability, higher char yield, better fire resistance and lower water absorption than currently-used epoxy systems.

There are problems with maleimides, however, such as solvent retention in the prepregs, high temperatures often needed for curing with attendant distortion and high cost, and the brittleness of the polymers due to the high crosslink density obtained in network polymers. Brittleness can be such a problem that a single minor impact can greatly reduce the strength of a maleimide-based composite. These problems have prevented the wide application of the carbon-reinforced maleimides in aircraft primary and secondary structures where their high strength and fire resistance is much sought after.

A number of methods have been proposed to minimize some of the aforesaid problems. For one, the basic maleimide structure can be modified. For another, the bismaleimides can be copolymerized with comonomers. The present invention concerns vinyl pyridine group-containing compounds and their incorporation as comonomers into bismaleimide resins. One of the types of vinyl pyridine group-containing compounds has a vinyl styrylpyridine structure, i.e., a

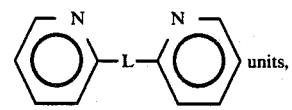

wherein n is 1 to 10, each of the $R_1$ is hydrogen or lower alkyl and $R_2$ is an organic group. U.S. Pat. No. 4,362,860 of Ratto et al discloses such materials as well as the materials where $R_2$ is hydrogen as thermosetting polymers but does not suggest their copolymerization with bismaleimide. Rockwell International's Final Report (Phase I) (Aug. 19, 1980–Nov. 30, 1981) in NASA contract NAS2-10709 further discusses the Ratto et al findings where $R_2$ is hydrogen and shows that the one step synthesis route it discloses gives a mixture product which must be fractionated to obtain the desired vinyl styrylpyridine materials.

U.S. Pat. Nos. 3,810,848 and 3,810,872 disclose a family of complex-forming polymers having

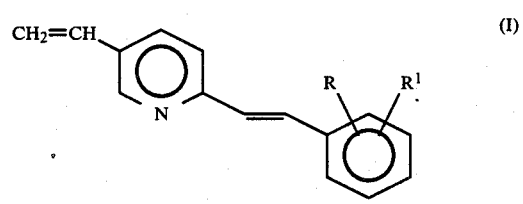

wherein L is a covalent bond or O, S, CO, CHR or NR and R is hydrogen or an alkyl. At Example 6, U.S. Pat. No. 3,180,848 shows condensing such a polymer with a pyromellitic anhydride to give a maleimide-like copolymer structure. Another patent of interest is U.S. Pat. No. 3,994,862 of Ropars, et al. which discloses condensation products of trimethylpyridine with aromatic aldehydes to give prepolymers which differ from the present vinyl-terminated styrylpyridines in not having the vinyl terminis. Ropars, et al. also does not show copolymers with bismaleimides.

STATEMENT OF THE INVENTION

It has now been found that the properties of bismaleimide resins and their preparation conditions are substantially improved by incorporating with the bismaleimide resins, as copolymeric units, the vinyl pyridine 5-vinyl-2-stilbazole of the structure

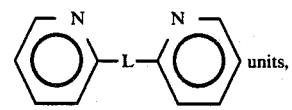

and/or the vinyl styrylpyridine oligomer of the structure

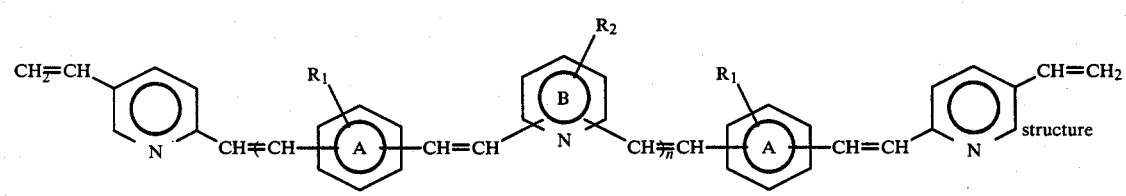

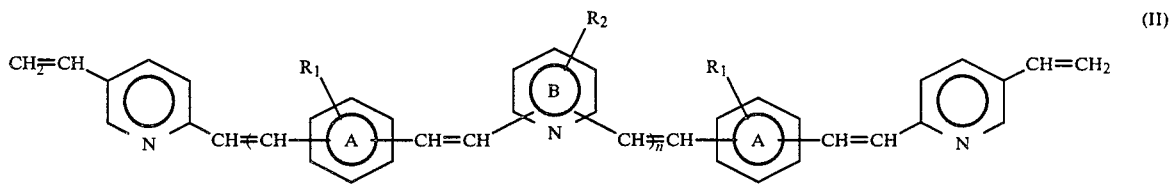

wherein R and $R^1$ are independently selected from hydrogen, aryls, lower alkyls, alkoxy and halos, $R_1$ is hydrogen or lower alkyl, and $R_2$ is a 1 to 4 carbon organic group.

In another aspect, this invention provides the vinyl stilbazole materials as novel comonomers.

In a further aspect, this invention provides composites made up of the bismaleimide resin copolymers cured with a reinforcing amount of reinforcing fiber. The copolymer resins can be applied as solvented "varnishes" or very advantageously as "hot melts".

In an additional aspect, the invention provides a high yield two step synthetic path to the vinyl styrylpyridine oligomer (II).

Yet another aspect of this invention concerns a low temperature cure process for the bismaleimide resins in which the above-described copolymers are cured at temperatures of from about 130° C. to 230° C.

BRIEF DESCRIPTION OF THE DRAWING

The present invention will be described with reference being made to the accompanying drawing in which FIG. 1 is a differential scanning calorimeter plot of the relative cure temperatures of the copolymers of this invention and the individual monomers alone.

DETAILED DESCRIPTION OF THE INVENTION

Vinyl stilbazole

The vinyl stilbazole materials of this invention have the structure

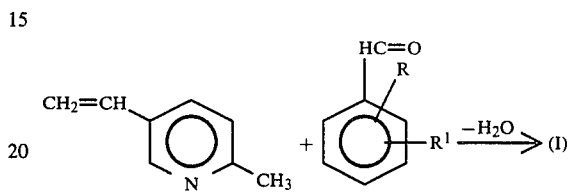

wherein each of R and $R^1$ are independently selected from hydrogen; lower alkyls, alkoxy, aryls and halos, i.e., 1 to 4 carbon alkyls and alkoxy, chloros, iodos, bromos, phenyls and alkyl phenyls of 7 to 9 carbons and the like, especially methyl, ethyl, isopropyl, methoxy, ethoxy, chloros, and phenyl. Preferably at least one and more preferably both of R and $R^1$ are hydrogens.

Such materials are prepared by condensing 5-vinyl-2-methyl pyridine with an appropriately R and $R^1$-substituted benzaldehyde under dehydrating conditions as follows:

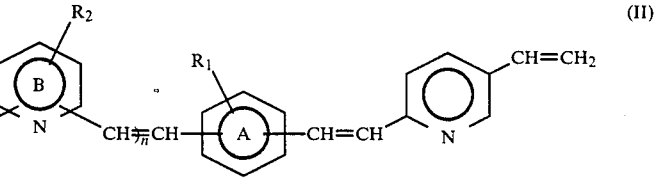

This reaction can be carried out neat, since the reactants are solvents for one another. A nonaqueous inert solvent such as DMF, glacial acetic acid, NMP (N-methyl-pyrolidone), DMAc or DMSO could be used if desired. The dehydration conditions are suitably provided by acetic anhydride, optionally in combination with acetic acid and/or a catalyst like $ZnCl_2$ to activate the methyl groups. The condensation is carried out a temperature of from about 50° C. to about 140° C. Higher temperatures are generally to be avoided as they may lead to some degree of polymerization of the product. The reaction is not rapid at these temperatures, generally requiring at least about 4 hours and preferably 6 to 60 hours. The reaction is preferably carried out in the substantial absence of oxygen—either under reduced pressure or under an inert atmosphere like nitrogen or argon. Usually, about equimolar amounts (i.e., from 1 to 1.1 to about 1.1 to 1 moles) of the vinyl pyridine and the aldehyde are employed. An excess of one material or the other could be employed, but the excess would only have to be removed from the final product.

Vinyl styrylpyridine oligomers

The vinyl styrylpyridine oligomer materials have the structure

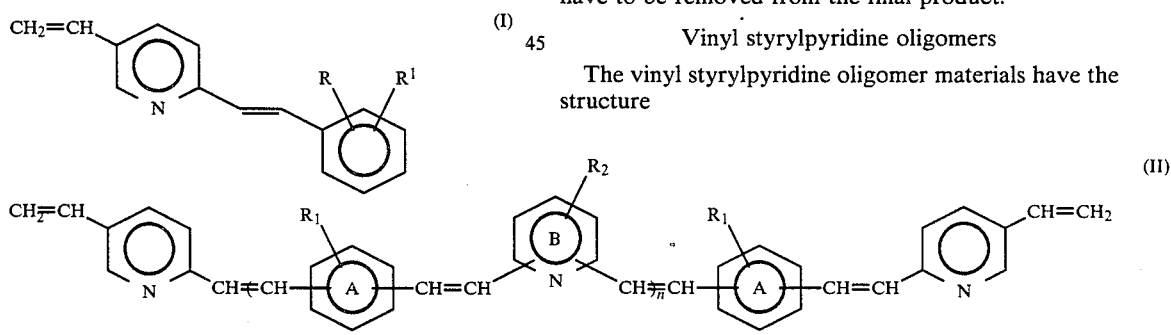

wherein n is an integer from 1 to 10, most advantageously 1 to 4, $R_1$ is hydrogen or a lower alkyl of 1 to 4 carbons, especially hydrogen or methyl, but more especially, hydrogen; and $R_2$ an organic group such as is a 1 to 4 carbon alkyl, or a 1 to 4 carbon alkoxy, a halo-substituted 1 to 4 carbon alkyl, such as, for example, methyl, ethyl, propyl, butyl, methoxy, ethoxy, 2-chloroethyl, chloromethyl. $R_2$ is especially a methyl or methoxy.

The structure II is an "average" structure and is provided to show a representative structure at the A and B rings. The exact substitution patterns on the A and B rings can vary. The A rings should have their two double bonds in a "1,3" (meta) or "1,4" (para) configuration. The B rings should have their two olefin groups i.e. "vinyl" groups and $R_2$ in a "2,6-divinyl-4-$R_2$" or a "2,4-divinyl-6-$R_2$" configuration.

These oligomeric materials are prepared by the two step process of (1) condensing a 2,6-dimethyl-4-$R_2$-pyridine or a 2,4-dimethyl-6-$R_2$-pyridine such as collidine, or the like with an $R_1$-substituted aromatic dialdehyde such as an "$R_1$-substituted" terephthaldehyde under dehydrating conditions and in the absence of a vinyl pyridine and (2) thereafter treating the reaction product with 5-vinyl-2-methylpyridine again under dehydrating conditions, for example:

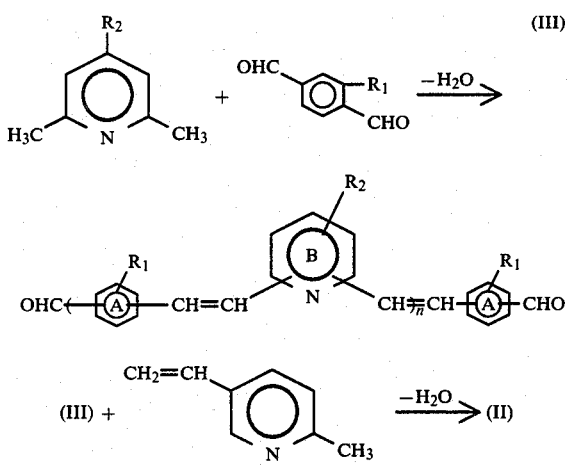

In the first step of this reaction the number of equivalents of aldehyde should be greater than the number of equivalents of methyl groups on the 2 and 4 or 2 and 6 positions on the dimethyl-$R_2$-substituted pyridine, preferably from 1.0 to 1.5 times the number of 2,4 or 2,6 methyls. In the second step the combined equivalents of 2,4 or 2,6 methyls plus vinyl methylpyridine is larger than the total equivalents of aldehydes (i.e., from 1.0 to 2.0 times). As with the stilbazole materials, a catalyst like $ZnCl_2$ can be present if desired. The temperature for reacting the collidine or the like with the dialdehyde may be selected in the range of about 130° to 190° C., preferably 140° to 180° C. and more preferably about 160° C. for times of 1–40, especially 1–20 hours. An inert oxygen-free atmosphere is preferred. The coupling of vinyl methylpyridine to residual aldehyde groups is carried out at somewhat lower temperatures, e.g., 80° to 130° C., preferably 80° to 120° C. and especially about 110° C. again for 1 to 40, and especially 1 to 20 hours, preferably in an inert atmosphere. The dehydrating conditions are achieved by having a water acceptor such as an acid anhydride, e.g. acetic anhydride, in the reaction zone or by permitting the water that is formed to evaporate. This two step process has the advantage of allowing precise control of each of the two reactions. In comparison to the one step process of Ratto et al U.S. Pat. No. 4,362,860, this process gives a more reproducible product in higher yield.

The Bismaleimides

The bismaleimide is represented structurally by the formula

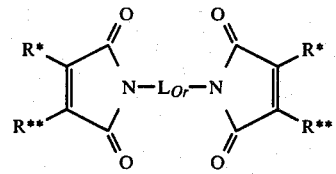

wherein R* and R** independently are hydrogen or a 1 to 4 carbon alkyl. Preferably R* and R** are hydrogen or $CH_3$ and more preferably at least one of the groups is hydrogen. $L_{Or}$ is a covalent organic linking group, that is a bivalent organic group containing in its structure an aliphatic chain or at least one aromatic ring. Many suitable examples of these bismaleimides are available commercially. They are prepared synthetically by a sequenced addition of a diamine to maleic anhydride followed by cyclization. Bismaleimide materials can be drawn from resins having as $L_{Or}$ simple

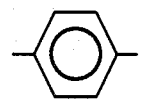

aromatic rings as were used in the pioneering Gemon resins sold by General Electric, and

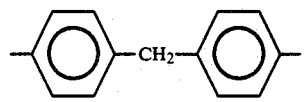

aromatic rings as are found in commercial Kerimid 353 and Kerimid 601 resins of Rhone-Poulonc to more involved materials such as Technochemie's H-795 resin:

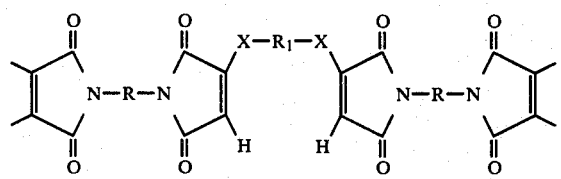

wherein R is an aromatic ring and X—$R_1$—X is a Michael addition coupling group Technochemie's M-751 resin which is an "eutectic" mixture of

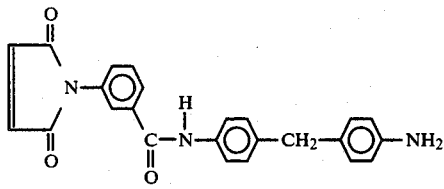

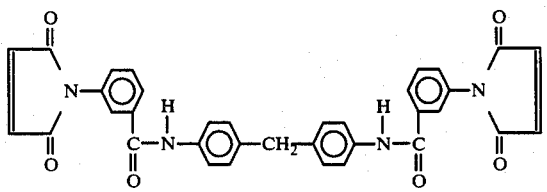

In general, $L_{Or}$ can be any organic linking group that is relatively inert, that permits the bismaleimide to be intimately admixed with the vinyl pyridine material either by melting or by dissolving in a common solvent and that does not interfere with the reactivity of the maleimide units. The M-795 type bismaleimides offer the advantage of working well in hot-melt systems.

Copolymers

The copolymers of this invention are composed of the vinyl styrylpyridine oligomers and/or vinyl stilbazole copolymerized with one or more bismaleimides. The properties of the cured composite will depend in part of the relative amounts of the vinyl styrylpyridine oligomers and/or vinyl stilbazole and the bismaleimide. As the proportion of vinyl stilbazole is increased, the product becomes less flame-resistant when fully cured but easier to cure. As the proportion of the vinyl stilbazole is increased, a more amorphous, less brittle, less crystalline, tougher product is achieved, but one which has decreased flame retarding because of lesser char yield on pyrolysis.

With vinyl stilbazole the preferred maximum proportion of stilbazole is about 2 mole per mole of bismaleimide since under the usual cure conditions the vinyl group on the stilbazole reacts with the bifunctional maleimide. With the vinyl styrylpyridine oligomer materials, any proportion can be employed. In general, however, it is desired to have a cured product with good flame retardency and thus to employ at least about one mole of bismaleimide per mole of vinyl styrylpyridine and/or vinyl stilbazole. To achieve the improved product properties, it is generally desired to use at least about 0.05 moles of vinyl stilbazole or vinyl styryl pyridine per mole of bismaleimide. On a weight basis, it is preferred to employ maleimide to vinyl pyridine ratios of 15:1 to 1:1, especially 10:1 to 2:1.

Cured Products

The cured resins of this invention find ready use as moldable plastics and especially as binders or substrates for reinforced composites. The reinforcement is generally a fiber and can be organic or inorganic and in organized or disorganized form, for example carbon fiber, aramide fiber or glass fiber as yarns, fabrics, or felts; or such material as chopped fiber. Other materials known in the art as polymer reinforcements, for example boron nitride, and metal fibers, can be employed as well. Carbon fibers is the preferred reinforcement.

Conventional ratios of reinforcement to substrate are employed, such as from about 0.5 to about 5 parts by weight of reinforcement per part of substrate.

Other materials such as fillers, pigments, antioxidants and the like can be added as well, if desired.

Copolymer Formation and Cure

It is an important advantage of the present copolymers that their cure conditions are far less severe than those employed with the bismaleimides alone. Thus, it is less expensive to cure the present materials and less distortion occurs during cure. It is also an important advantage that the present copolymers, as they cure, do not give off volatile components which can generate voids and decrease the strength of the final cured products.

Copolymers are formed by admixing the bismaleimides and the vinyl styrylpyridine oligomer and/or vinyl stilbazole in the desired ratio and heating. The mixing can be carried out in a polar organic solvent such as chloroform, tetrahydrofuran, dichloroethane, ketones such as acetone, methyl ethyl ketone, and the like, or it can be carried out using a hot melt of the next copolymer components. This liquid mixture (or varnish) is mixed with the reinforcement, by dipping, coating or the like. Any solvent is preferably removed prior to cure to avoid voids created by solvent volatilizing from partially cured resin.

A typical cure cycle for a copolymer might employ 110°–170° C. to remove solvent if present (or lower temperature if vacuum is applied) and 130° to 230° C. for curing. In general the copolymers of vinyl stilbazole materials cure at lower temperatures, i.e., 130°–190° C. than do the vinyl styrylpyridines which usually require 160°–230° C. Such temperatures are far lower than required for the bismaleimides alone. This can be shown experimentally using a differential scanning calorimeter which measures heat flow and can detect when the exothermic curing reactions take place. Three experiments were carried out in such a calorimeter and their results are given in FIG. I.

First, a bismaleimide (Technochemie H795) was placed in the unit and heated. The peak heat flow—indicating maximum curing rate required was 282.4° C. Second, vinyl stilbazole alone was tested. No distinct cure peak was detected even up to and over 400° C. In the third experiment 3 parts by weight of vinyl stilbazole was mixed with 7 parts weight of Technochemie H795 resin. The cure temperature observed was 164° C., as shown in FIG. 1. With copolymers of vinyl styrylpyridine the cure peak would be about 200° C. These substantially reduced curing temperatures offer advantages of less distortion and/or shrinkage during cure and lower energy requirements.

The copolymers of this invention are formed into castings or molded products by conventional processes. They can be formed into reinforced structural bodies by any of the methods known in the art including pressure forming, hand lay-up, pull-truding, filament winding, vacuum laminating and the like and the invention is not to be construed as limited to any particular forming technique.

Using a representative pressure molding technique with a solvated vinyl styrylpyridine bismaleimide copolymer one might employ the melting/solvent stripping/cure cycle shown in Table I.

TABLE I

| Mode | Temperature | Pressure | Time |
|---|---|---|---|
| Heat-solvent removal or melt mixture from hot melt | 150° C. | 0 | 20 min |
| Heat and Press | 180° C. | 75 psi | 10 min |
| Heat and Press | 190° C. | 100 psi | 40 min |
| Heat and Press | 200° C. | 100 psi | 200 min |

Infrared analysis of a material cured by such a schedule shows that it contains the internal double bonds of the original feedstock and that they have not polymerized. This is important to fire resistance as these bonds are available to react during pyrolysis to form additional organic rings as needed for char formation.

In general, one does not have to employ curing agents or catalysts with the present resin systems. It is often desired to not have curing take place during solvent removal so as to minimize or avoid forming voids due to the solvent release in the cured body or to maximize pot life of a melt in which case one would prefer to not have a catalyst present. If this is not considered a problem, as might be the case with injection molded parts, any conventional peroxide or other free-radical initiator can be employed as catalyst.

The invention will be further described by the following preparations and examples. These are provided to illustrate the invention and are not to be construed as limiting its scope which is instead defined by the claims.

PREPARATION I

Two Step Preparation of Vinyl Terminated Polystyrylpyridine

Step 1: 18.0 g (0.3 mole) of acetic acid, 30.6 g (0.3 mole) of acetic anhydride, 20.1 g (0.15 mole) of terephthaldehyde, and 12.1 g (0.1 mole) of collidine were placed in a 500 ml, 3-necked round-bottom flask equipped with a mechanical stirrer and a reflux condenser. After the reaction solution was deoxygenated, the flask was immersed in an oil bath and the reaction solution was heated at 130° C. to 170° C. for several hours. Step 2: The reaction solution was cooled to room temperature and 17.0 g (0.15 mole) of 5-vinyl-2-methyl pyridine was added. The solution was degassed again and heated to 80° C.-120° C. for several hours. The reaction mixture was then poured into 10% NaOH solution. The brownish viscous product was washed with 10% NaOH solution, then with de-ionized water until the aqueous layer tested neutral. All the water was decanted and the product was dissolved in THF and filtered. The filtrate was then poured into large quantity of de-ionized water to precipitate out VPSP (II). This purification was repeated several times. Finally, the product was dried in vacuum and stored in THF. For hot melt applications, the product could be stored neat.

PREPARATION II

Preparation of Vinyl Stilbazole 50.0 g (0.42 mole) of 5-vinyl-2-methyl pyridine, 44.6 g (0.42 mole) of benzaldehyde, 25.2 g (0.42 mole) of acetic acid, and 42.9 g (0.42 mole) of acetic anhydride were placed in a 1000 ml, 3-necked round-bottom flask equipped with a mechanical stirrer and a reflux condenser. After the reaction solution was deoxygenated, the flask was immersed in an oil bath and the reaction was held at 80° C.-120° C. for several days. The reaction solution was then cooled to room temperature and poured into a large beaker containing 10% NaOH solution. The mixture was stirred for half an hour and the aqueous layer was decanted. The brownish viscous product was washed several timed with 10% NaOH solution, then with deioized water until the aqueous layer tested neutral. All the water was decanted and the product was dissolved in THF and filtered. The filtrate was then poured into large quantity of de-ionized water to precipitate out vinyl stilbazole. This purification was repeated several times. Finally, the brownish product was dried in vacuum, weighed and transferred into a storage container using THF as solvent. For hot melt applications, the product could be stored neat.

EXAMPLE 1

A maleimide copolymer was prepared as follows: 1 part by weight of vinyl stilbazole (VST) as prepared above and 4 parts of Technochemie H795 bismaleimide resin was dissolved in THF. The THF was removed to give an intimate mixture of the two comonomers. A portion of this material was placed in a differential scanning calorimeter and gradually heated to detect the cure temperature of 197° C. The cured material's glass-transition temperature (Tg) was determined to be 380° C. and its polymer decomposition temperature in $N_2$ was seen to begin at 400° C. The material had a high char yield (43% at 800° C.) indicative of excellent flame retarding properties. It had a composite modulus at 25° C. of 15 GPa and 12 GPa at 300° C.

A series of other copolymers based on H795 bismaleimide and the varying amounts of the above-described VST or vinyl styrylpyridine (VPSP) were prepared and similarly tested and compared with a currently favored epoxy and the bismaleimides alone. The results which demonstrated the advantages of the present invention are given in Table II.

TABLE II

| RESIN SYSTEM | Cure Temperature (DSC PEAK), °C. | $T_g$ °C. | PDT ($N_2$) °C. | CHAR YIELD at 800 % |
|---|---|---|---|---|
| EPOXY (MY720) | 255 | 250 | 300 | 30 |
| BISMALEIMIDE (H795) | 282 | >400 | 400 | 42 |
| COPOLYMERS: | | | | |
| VST:H795 = 1:4 | 197 | 380 | 400 | 43 |
| VST:H795 = 3:7 | 164 | | 400 | 36 |
| VPSP:H795 = 1:9 | 245 | >400 | 400 | 43 |
| VPSP:H795 = 1:4 | 230 | >400 | 400 | 50 |
| VPSP:H795 = 3:7 | 226 | 400 | 400 | 55 |

EXAMPLE 2

Another portion of the various copolymers of Example 1 were formed into graphite-reinforced composites.

In a typical preparation 9 ply satin-weave graphite fiber cloth was heated at 310° C. overnight to remove sizing in air. The resin system, for example VST/H795 3:7 by weight was dissolved in THF and brushed on the fiber:

Fiber weight—245 g.

Fiber coating weight—405 g.

Excess resin (47 g) was removed when the fiber was lightly pressed to give a resin content of 31.5%. The product was press cured as follows:

1. No pressure—heated to 250° F. for 10 min to remove solvent.
2. No pressure—heated to 320° F. for 10 min to complete solvent removal.
3. At 75 psi—heated to 356° F. for 10 min.
4. At 100 psi—heated to 374° F. for 40 min.
5. At 100 psi—heated to 392° F. for 200 min.
6. Cool to room temperature with pressure.

The properties of the composite as well as other similar composites made with other copolymer systems were evaluated and compared with H795 and VPSP alone. The results are shown in Table III.

The composites of this invention find especially advantageous application in structures which are exposed to extreme environments. They may be formed into primary and secondary structures for aircraft, spacecraft and the like (e.g. panels, wing spars and the like) where their high performance thermal behavior is such as to minimize human risks.

TABLE III

MECHANICAL PROPERTIES OF VST, VPSP/BMI COPOLYMER COMPARED WITH H795 GRAPHITE COMPOSITES

| PHYSICAL & MECHANICAL PROPERTIES | H795 | RESIN SYSTEM WITH 9 PLY SATIN-WEAVE GRAPHITE FIBER | | | | VPSP |
| --- | --- | --- | --- | --- | --- | --- |
| | | VPSP/H795 1:4 | VST/H795 1:4 | VPSP/H795 3:7 | VST/H795 3:7 | |
| RESIN CONTENT % | 30.5 | 26 | 30 | 30.2 | 31.5 | 26 |
| DENSITY, g/cc | 1.55 | 1.43 | 1.39 | 1.4 | 1.39 | 1.44 |
| LOI (4 PLY SAMPLE) | 52 | 62 | 46 | 55 | 45 | 57 |
| WATER ABSORPTION, % 2 hrs BOILING WATER | 0.72 | 1.17 | 0.99 | 1.20 | 0.86 | 1.36 |
| SHORT BEAM SHEAR R.T. KSI | 1.7 | 2.95 | 2.96 | 2.7 | 2.89 | 3.15 |
| R.T. FLEXURAL MODULUS, MSI | 7.7 | 7.3 | 7.3 | 7.4 | 7.4 | 7.6 |
| STRENGTH, KSI | 24 | 41 | 46 | 44 | 41 | 49 |
| FLEXURAL, 100° C. MODULUS, NSI HOT-WET | 5.8 | 7.1 | 6.9 | 7.0 | 6.3 | — |
| STRENGTH, KSI HOT WET | 24 | 37 | 44 | 40 | 37 | — |
| YOUNG'S MOD, GPa | | | | | | |
| 25° C. | 15 | 15.5 | 13 | 15 | 15 | — |
| 300° C. | 14 | 15 | 12 | 14 | 13.5 | — |

What is claimed is:

1. In a process for thermally curing a bismaleimide resin into a solid polymer, the improvement comprising admixing with each 2.0 to 10 parts by weight of said bismaleimide resin, one part of a 5-vinyl-2-stilbazole of the structure

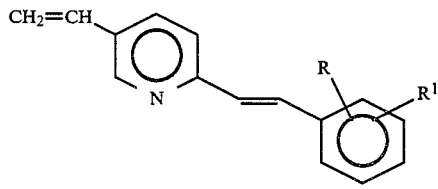

wherein R and R¹ are independently selected from hydrogen, lower alkyls, lower alkoxy, phenyls, bromo, chloro, or iodo and effecting the curing at a temperature of from about 130° C. to about 190° C.

2. In a process for thermally curing a bismaleimide resin into a solid polymer, the improvement comprising admixing with each 2.0 to 10 parts by weight of said bismaleimide resin, one part of a 5-vinyl-2-stilbazole of the structure

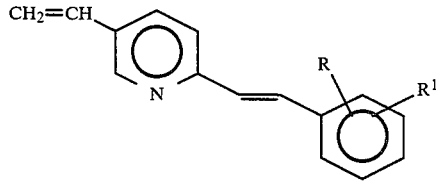

wherein R and R' are independently selected from the group consisting of hydrogen, lower alkyls, lower alkoxy, phenyl, alkyl phenyls of 7 to 9 carbons, chloro, bromo and iodo and effecting the curing at a temperature in the range of from about 130° C. to about 190° C.

3. The process of claim 2 wherein R and R' are independently selected from hydrogen and lower alkyls.

4. The process of claim 1 wherein one of R and R' is hydrogen.

5. The process of claim 4 wherein one of R and R' is methyl.

6. The process of claim 2 wherein R and R' are independently selected from hydrogen or lower alkoxy.

7. The process of claim 6 wherein one of R and R' is hydrogen.

8. The process of claim 2 wherein R and R' are hydrogen, phenyl or alkyl phenyls of 7 to 9 carbon atoms.

9. The process of claim 8 wherein one of R and R' is hydrogen.

10. The process of claim 9 wherein one of R and R' is phenyl.

11. The process of claim 2 wherein R and R' are independently selected from hydrogen, chloro, bromo or iodo.

12. The process of claim 11 wherein one of R and R' is hydrogen.

13. The process of claim 2 wherein R and R' are each hydrogen.

14. In a process for thermally curing a bismaleimide resin into a polymer, the improvement comprising admixing with each 1.0 to 15 parts by weight of said bismaleimide resin one part by weight of a vinyl styrylpyridine oligomer of the structure

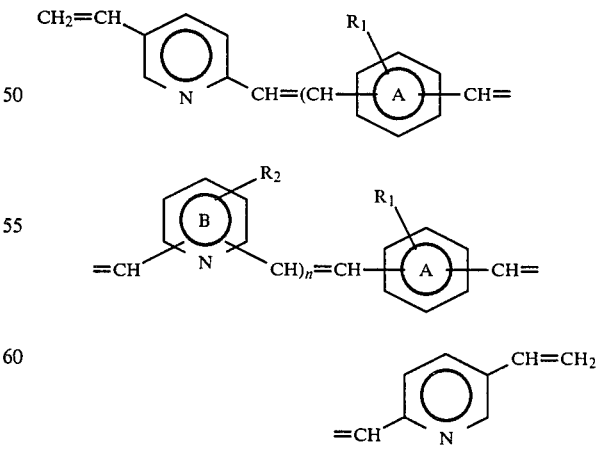

wherein in the A aromatic rings R₁ is hydrogen or lower alkyl and the two olefin bonds are attached to the aromatic ring meta or para to one another, and in the B aromatic ring R₂ is a lower alkyl, haloalkyl, or alkoxy and the two olefin bonds are attached to the B aromatic ring in the 2, 6 or 2, 4 positions, with $R_2$ in the 4 or 6 position not occupied by an olefin bond, and effecting the curing at a temperature in the range of from about 160° C. to about 230° C.

15. The process of claim 14 wherein $R_1$ is hydrogen.

16. The process of claim 15 wherein $R_2$ is a one to four carbon atom.

17. The process of claim 16 wherein $R_2$ is methyl.

18. The process of claim 15 wherein $R_2$ is a one to four carbon atom alkoxy.

19. The process of claim 18 wherein $R_2$ is methoxy.

20. The process of claim 15 wherein $R_2$ is a one to four carbon atom haloalkyl.

* * * * *